Figure 2:
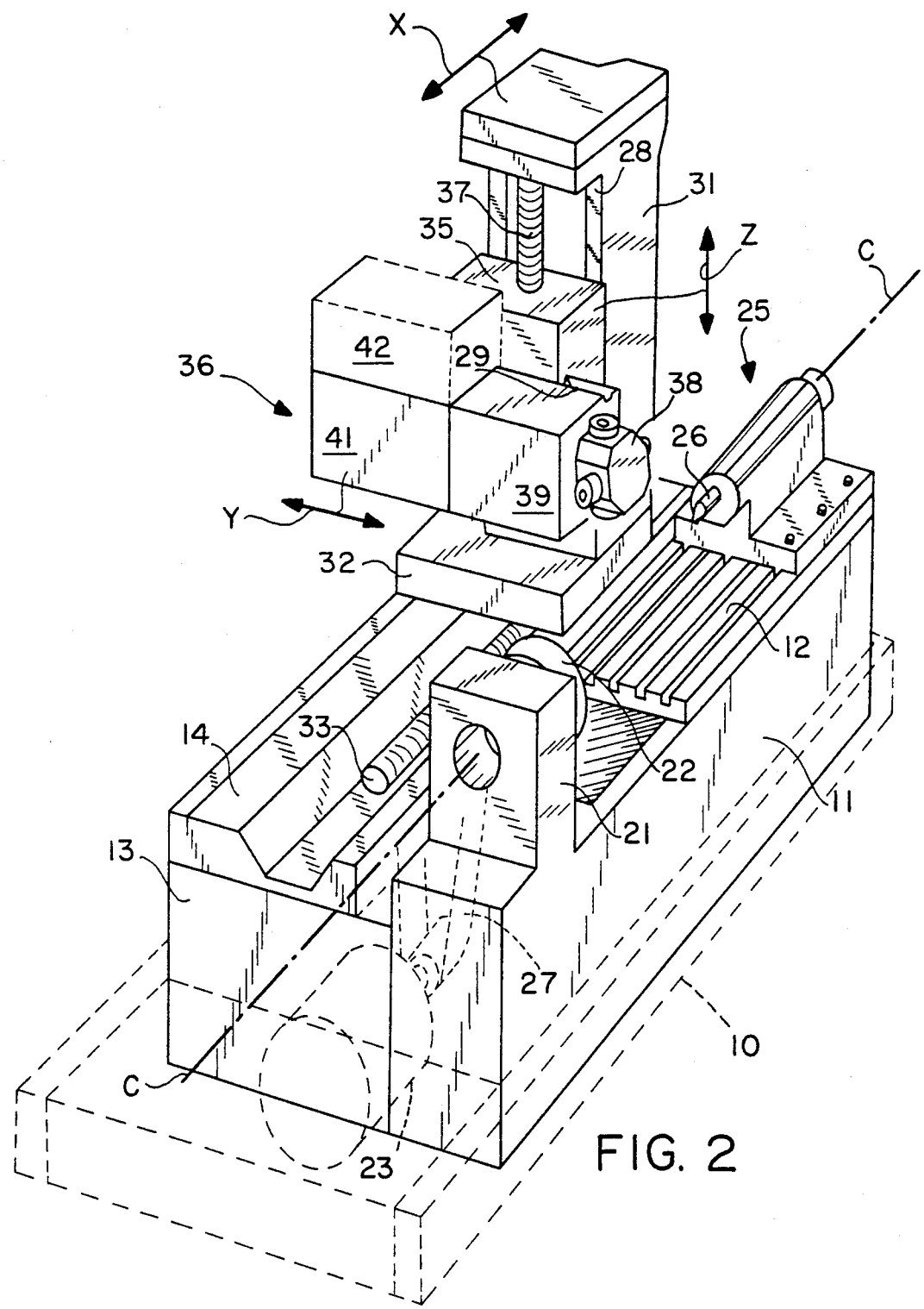

United States Patent [19]

Gadaud et al.

[11] Patent Number: 5,052,089
[45] Date of Patent: Oct. 1, 1991

[54] MULTI-FUNCTION MACHINE TOOL WHICH PERMITS COMPLEX MACHINING OF LONG PIECES

[75] Inventors: André Gadaud, St Geneviéve des Bois; Michel Gagnal, Bougival, both of France

[73] Assignee: Somab, S.A., Moulins, France

[21] Appl. No.: 465,084

[22] PCT Filed: May 22, 1989

[86] PCT No.: PCT/FR89/00242
§ 371 Date: Jan. 22, 1990
§ 102(e) Date: Jan. 22, 1990

[87] PCT Pub. No.: WO89/11374
PCT Pub. Date: Nov. 30, 1989

[30] Foreign Application Priority Data

May 25, 1988 [FR] France .............................. 88 07261

[51] Int. Cl.⁵ ............................................. B23B 11/00
[52] U.S. Cl. ...................................... 29/27 R; 82/120; 82/121; 82/142; 82/149; 82/162; 409/166; 409/134
[58] Field of Search ............... 29/27 R,A,C, DIG. 50, 29/DIG. 56, DIG. 59, DIG. 60, DIG. 86, DIG. 94; 82/120, 121, 149, 142, 162; 409/165, 166, 134

[56] References Cited

U.S. PATENT DOCUMENTS

| | | | |
|---|---|---|---|
| 1,881,147 | 10/1932 | Thoma | 82/162 |
| 3,618,432 | 11/1971 | Briese | 82/149 X |
| 3,878,742 | 4/1975 | Lahm | 82/110 X |
| 4,571,796 | 2/1986 | Sellner et al. | 29/27 R |
| 4,683,787 | 8/1987 | Link | 409/166 X |
| 4,777,713 | 10/1988 | Kitamura | 29/27 X |
| 4,936,174 | 6/1990 | Holy et al. | 29/DIG. 56 |

FOREIGN PATENT DOCUMENTS 2224761 11/1973 Fed. Rep. of Germany .
775044 5/1957 United Kingdom ................ 409/218

Primary Examiner—Steven C. Bishop
Attorney, Agent, or Firm—Curtis, Morris & Safford

[57] ABSTRACT

The machine tool of the invention combines the following three features: the workpiece holder (22) rotates around an axis (C) which is referred to as horizontal turning axis and is parallel to one (X) of the three orthogonal axes (X, Y, Z), the said axis (C) overlying a table (12) the flat upper-face of which is parallel to said turning axis (C) and comprises means for fastening one or more support and/or centering means (15, 24); the toolholder (38) comprises two clamping mandrels, one for a stationary tool and the other for a rotary tool; the workpiece holder is in relation with drive means (23, 25) which confer upon it one of the three kinematics of the following kinematic group: immobilization in a given angular position, a so-called slow speed of rotation for milling operations which are not parallel to the axis (C), and a so-called high speed for the turning.

13 Claims, 3 Drawing Sheets

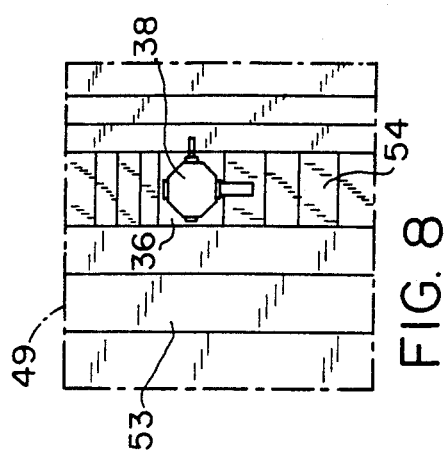
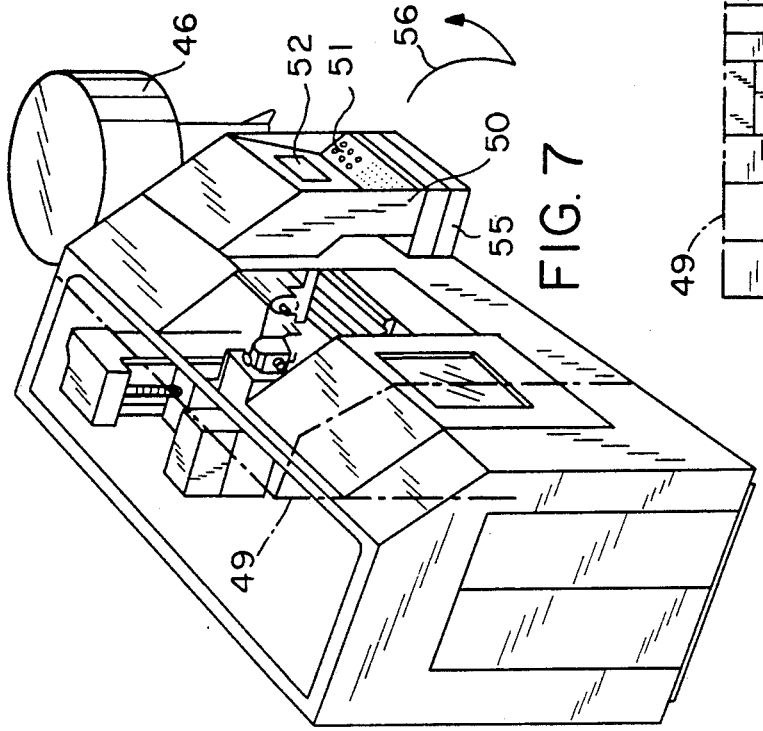
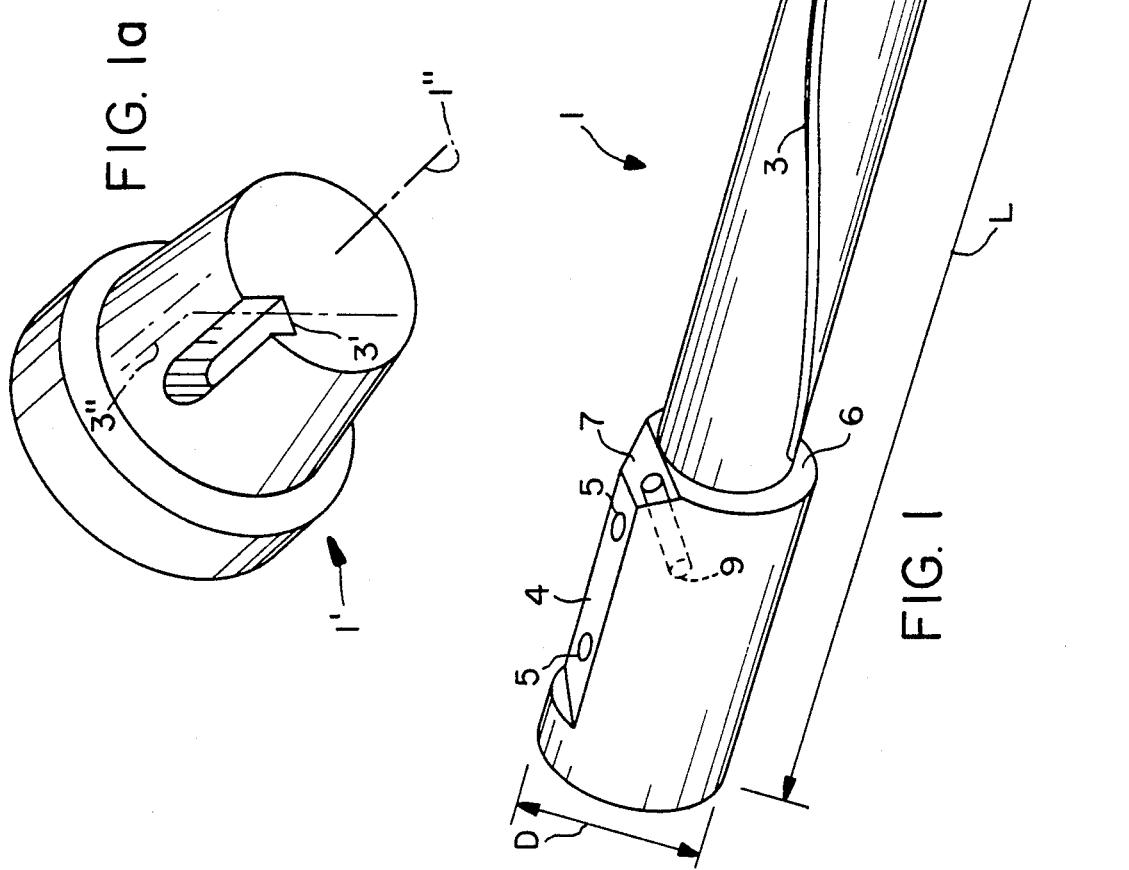

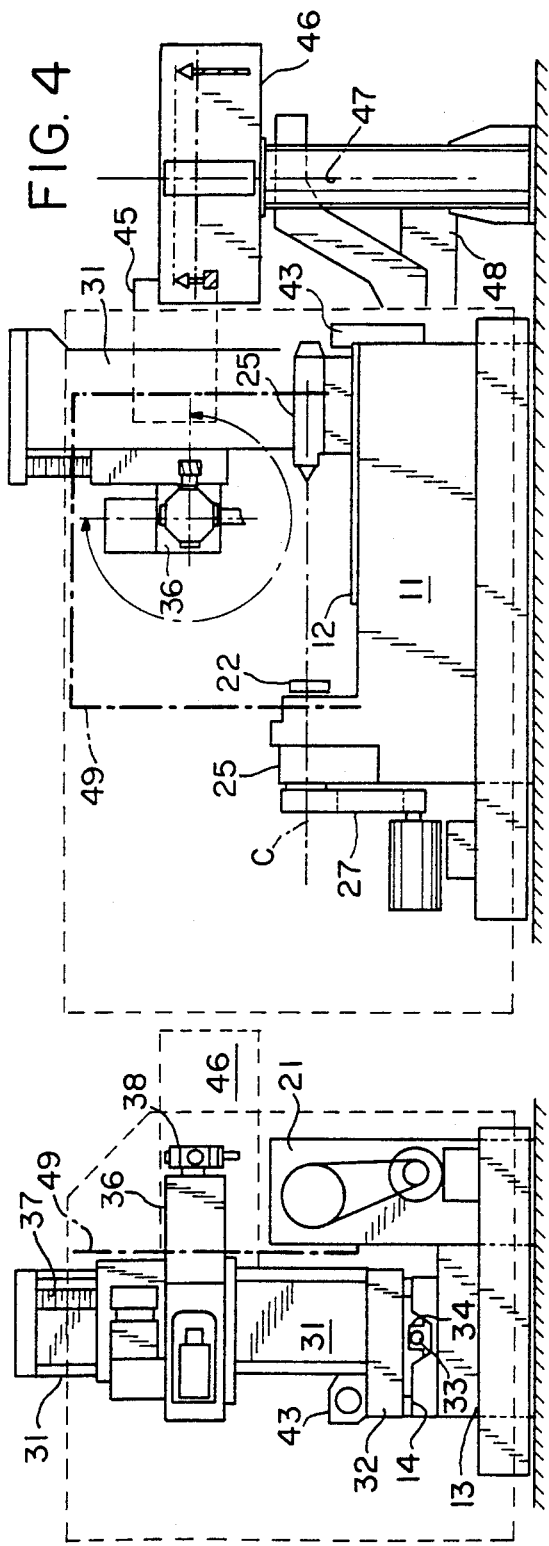
FIG. 4
FIG. 3
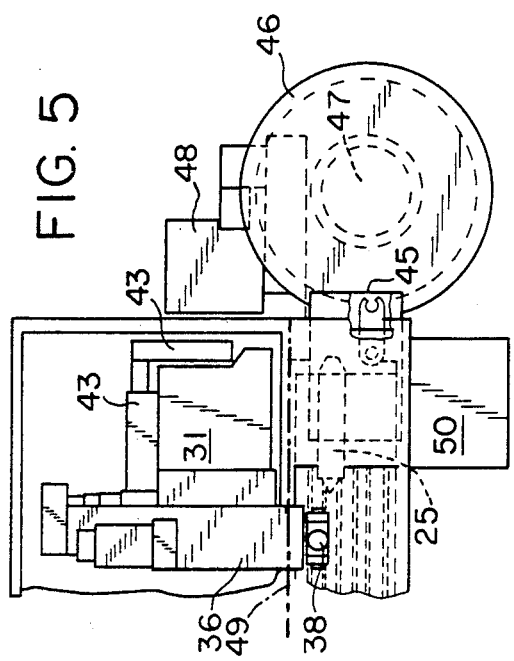
FIG. 5
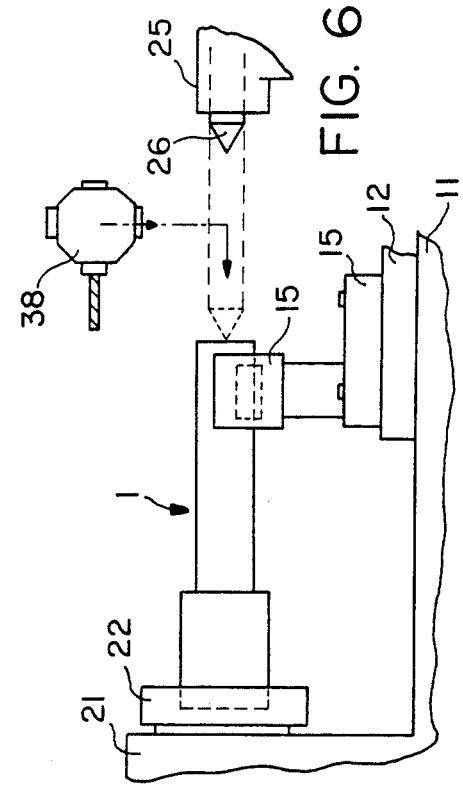
FIG. 6

MULTI-FUNCTION MACHINE TOOL WHICH PERMITS COMPLEX MACHINING OF LONG PIECES

The present invention lies in the field of machine tools intended for the machining of parts by removal of material and its object is more particularly a multi-function machine which makes it possible to carry out machining operations such as turning, milling and drilling on pieces which may be of rather large length.

The object of the invention is to propose a machine tool of the said type which, on the one hand, can be used either as a parallel lathe or as a milling machine or as "machining center", that is to say with a succession of stationary or rotating tools, and, on the other hand, permits complex machining (along at least two axes, one of which is an axis of revolution) of relatively long workpieces (L/D>3), in which L designates the length and D the diameter of the workpiece.

There are known, first of all, so-called parallel lathes in which a piece to be machined is supported by a workholder spindle called a mandrel, the rotation of the workpiece taking place around an axis of revolution C which is generally horizontal, while a stationary tool can move in two directions (X, Y), perpendicular to each other, of a plane parallel to the axis C; generally, but necessarily when there are concerned workpieces the dimension L of which along the C axis is greater than about three times the transverse dimension (D), a rotating center which is coaxial to the mandrel is used.

French Patent 2,581,907 (WIRTH & CRUFFAT) discloses a particularly modern lathe adaptation in which the workpieceholding spindle is mounted in slideable manner on guides while a toolholder can support stationary tools as well as rotating tools. There are also known so-called vertical lathes in which the axis of revolution of the workpiece holder is vertical; vertical lathes are not provided with a center and they are, in general, reserved for the working of heavy massive pieces.

Secondly, milling machines are known in which the piece to be machined is fastened on a table which can be moved along three orthogonal axes; the workpiece to be machined is presented to a rotating tool (mill) supported by a rotary spindle and mounted facing the table, the axis of rotation of the tool being generally perpendicular to one of the axes of displacement of the table.

Thirdly, more complicated machine tools are known which utilize the principle of operation of milling machines in which the piece to be machined is supported by a stationary table while a rotary tool is moved along three orthogonal axes; generally these machine tools, known as machining centers, are provided with automatic means for the loading of the tool-holding spindle as well as digital control means for the loading and displacing of the tool. The machining centers are well adapted to effect a series of operations on one and the same piece, which is generally large, such as an engine block; the replacement of the tools is effected by an attached machine known as a tool changer which complies with a general control program; undoubtedly the automatic replacement of the tools takes up a certain period of time of the operation of the machine but the high degree of automation of these machines compensates for this drawback; it will be noted, however, that, in view of the complex nature of the programming of their operation, machining centers are reserved for mass production.

Machine tools are also known of the type comprising the functional organization of vertical lathes but with three axes of displacement of the tool with respect to the piece to be machined and, for some of them, the possibility of using rotary tools. It will be noted that the downward drilling and sometimes the milling of the horizontal upper faces raises the problem of the evacuation of the chips.

The first example of this type of machine tool is disclosed in U.S. Pat. No. 346,435 (H. HUCKS et al.); however, the machine of that patent is of the "interrupted bench" type; furthermore it has only a single tool spindle, which can, however, be oriented.

A second example of a machine of this type is disclosed in French Patent 2,555,086 (COTTIN). The machine described in that patent has a toolholder head which can receive either a stationary turning tool or rotary drilling or milling tool; by successive rotation and locking of the work-holder spindle, one can machine the faces of the piece by milling; a second head may be provided on this machine and operate at the same time as the first. This machine, of the vertical lathe type, would not be suitable for turning or milling a workpiece of substantial length or, priori, for milling a helical cam groove along such a piece.

A third example of such machines of vertical lathe structure is disclosed in French Certificate of Addition 2,585,276 (SATECO) which constitutes an addition to French Patent 2,560,541. The machines described in these publications comprise, as main characteristic, the combination of a rotary workpiece holder which can pivot in a vertical plane and a toolholder which is displaceable along three orthogonal axes; the workpiece holder may assume different indexed positions for milling operations.

A fourth example of such vertical-lathe-structure machines is disclosed in French Patent 2,558,401 (WASCHINO). Here also the general structure of the machine is that of a vertical lathe associated with a toolholder which is moveable along three orthogonal axes; in this machine, a plurality of tools is supported by a rotary turret which can be placed in different indexed positions; due to this, it is possible to turn a workpiece, drill it, and mill it without having to remove and remount the tools on the turret; this arrangement solves the "problem of numerous changes of tools for the production of parts requiring a large number of different machinings", "without having recourse to the use of a machine tool of a larger model than is actually necessary for the carrying out of the machining proper".

With reference to said machine tool, it will be observed first of all that the number of tools mounted on the turret can only be small, on the order, for instance, of ten (the drawing suggests a number of six). Now it frequently happens that about fifty different tools are used; drills and millers of different diameters, turning tools of different shapes, different radii and orientations; furthermore, a required tool must frequently be resharpened and thereby frequently becomes of smaller diameter.

It will then be observed that the machined part cannot be very long (L>3) subject otherwise to bending. It will finally be noted that this machine is not intended for simultaneously driving the workpiece in rotation and the rotary tool in translation and therefore, for instance, to mill a helicoidal groove, which would require slow rotation of the toolholder, which is not provided for.

It would thus appear that none of the machine tools of the prior art known to the Applicant satisfies all of the purposes which it proposed for its invention.

In accordance with the present invention, a machine tool intended for the machining of parts by removal of chips of the type of machine tool consisting essentially of a rotary workpiece holder and a toolholder which is moveable with respect to the workpiece along three orthogonal axes, the workpiece holder and the toolholder being supported by a common frame, is characterized in general by the combination of the following three arrangements:

- The workpiece holder is rotatable around an axis (C) known as the horizontal turning axis and is parallel to one (X) of the said three orthogonal axes, the said axis (C) overlying a table the flat upper face of which is parallel to said turning axis and comprises means for fastening one or more support and/or centering means such as centers, roller supports or steady rests.
- The toolholder is a rotary turret which can be indexed in at least four positions and has two clamping mandrels, one for the stationary tool and the other for the rotary tool.
- The workpiece holder is in operative relationship with drive means imparting to it one of the kinematics of the following group of kinematics: the immobilizing in a given angular position (indexing), a so-called slow speed (between $10^{-2}$ and 10 rpm) for the milling, and a so-called high speed which is greater by about $10^3$ than the so-called slow speeds.

It results from these three features that turning, milling and complicated machining operations such as the milling of a helical cam groove can be performed on a relatively long workpiece (L/D > 3) without having to remove the workpiece from the workpiece holder, resulting in a very high precision of the position of the different machinings with respect to each other.

In accordance with a first secondary feature, the upper face of the said table is normally horizontal or else parallel to another (Y) of the said three orthogonal axes and it is grooved, parallel to the turning axis, in order to permit the fastening of the said support and/or centering means; the table is firmly attached to the frame and it will serve subsidiarily as a stationary milling table.

For this last-mentioned reason, the grooved table is more advantageous than a means of the slideway-bench type, which is substantially equivalent in its function of support of the center.

In accordance with a second feature, the mandrels of the toolholder, on the one hand, can be actuated for clamping and unclamping by means contained in the turret and, on the other hand, they can each assume two working positions (horizontal and vertical), a retracted position, and a loading-unloading position, this latter position being common to the two mandrels, while, finally, a load is associated with the machine tool.

A toolholder head having the said functions is described in a French patent application in the name of the Applicant, filed jointly herewith and entitled: "Multi-use machining head for machine tools".

In accordance with one structural arrangement, the first two kinematics of the aforementioned group, namely the immobilizing and the slow speed, utilize a toothed wheel and worm; it results from this that these kinematics can be controlled very precisely.

In accordance with another structural arrangement, the toolholder frame comprises a first pair of slideways parallel to the C axis and arranged substantially in a horizontal plane; these first slideways serve as guide for a first horizontally moveable carriage bearing a substantially vertical extension column; the column comprises a second pair of parallel slideways arranged in a plane perpendicular to the plane of the first slideways and perpendicular to the axis C; these second slideways serve as guide for a second vertically moveable carriage; the second carriage comprises a third pair of parallel slideways arranged in a plane perpendicular to the planes of the first and second slideways and therefore also perpendicular to the axis C; these third slideways serve as guide for a third horizontally moveable carriage, referred to as a "ram", which, at its end, supports the toolholder turret of axis of rotation parallel both to the plane of the first slideways and to the plane of the second slideways and therefore parallel to the axis Y.

Each of the aforementioned carriages is moved along its sideway by a nut and screw mechanism driven in rotation by an asynchronous motor controlled by a frequency variator; the position of each carriage is indicated by a 1/1000 mm vernier ruler device, for instance with optical reading. The marking is transmitted to an electric processor the program of which assures the control, drive and coordination of the case that the turret can be indexed in more than four positions, namely, for example, in positions which are an angular distance apart, a quasi-continuous displacement of the tool along its axis of rotation is made possible by the coordination of the movements of the carriages, whatever the inclination of the axis of the tool in the plane of rotation of the turret. This arrangement is of interest in view of the fact that, as stated above, a machining operation which employs such a displacement of the tool along its axis of rotation may be carried out between or after other operations without it being necessary to effect a resetting of the workpiece.

The present invention will be better understood and details thereof will become evident from the following description of a particular embodiment, read in conjunction FIG. 1: is a perspective view of a workpiece machined in a single clamping by the machine tool of the invention, FIG. 1a is a similar view of another example of a machined workpiece, FIG. 2: is a perspective view showing the main structural elements of the machine tool, FIGS. 3, 4 and 5: are end and side elevations and a partial top view, respectively, FIG. 6: is a partial diagrammatic side elevation illustrating the cooperation of essential parts, FIG. 7: is a perspective view illustrating the machine tool as a whole, and FIG. 8: is a front view of a protective curtain with which the machine tool is equipped.

In FIG. 1, a purely imaginative mechanical workpiece has the general shape of an elongated cylinder of a length L which is greater than its transverse dimension D; the ratio L/D is definitely greater than 3 and the machining of such a workpiece, particularly in the case of precise matching (better than a tenth of a millimeter), would be impossible without the use of a center; for this purpose, the workpiece 1 which is held within the jaws by its left-hand end in the figure, can be held at its other end by the center due to a centering hole 2; the workpiece comprises different machinings, namely a helicoidal groove 3 extending over its major part from its end, a flat 4 provided with holes 5 perpendicular to the turning axis C, a shoulder 6, and a flat fillet 7 connecting the flat to the part of smaller diameter; the fillet 7 is itself pierced by a cylindrical hole 9 perpendicular to the plane of the fillet and therefore inclined to the axis C and shifted from the central plane of the flap. In FIG. 1a, another workpiece 1' consists of a cylindrical part and a frustoconical part; the frustoconical part has a groove 3' having a median plane 3'' which is shifted with respect to the axis 1'' of the workpiece. It is entirely obvious that such workpieces could not be produced without rechucking in the known prior-art machines mentioned above, while it will be evident to the person skilled in the art that they can be produced with the use of the machine tool of the invention.

In FIG. 2, the basic structure of a machine tool in accordance with the invention, known as a multi-function machine, comprises a workpiece-holder bench 11, referred to as the first bench, supporting a grooved table 12 and a toolholder bench 13, referred to as the second bench, bearing a pair of first slideways 14.

In the preferred embodiment, the first bench 11 and the second bench 12 are elements formed of granite or reconstituted granite, the slideways 14 being made of cast iron and the table 12 of steel; the benches 11 and 13 are assembled by bolting in such a manner that no play is possible between them and they constitute the fixed frame of the machine tool. The fixed frame also bears a mechanowelded chassis 10 which itself supports subassemblies and parts of the machine which will be described further below.

The bench 11 has a vertical protuberance 21 forming the stationary headstock of traditional lathes, on which the workpiece-holder mandrel is rotatably mounted; on the other side of the headstock, a space is provided above the bench to receive the parts for the demultiplication of the drive of the mandrel and its immobilization (these parts are represented by 26 in FIG. 4); a drive motor 23 is sketched, fastened to the base at the rear of the parts, to which it is connected by a belt 27 (FIG. 4). The part of the bench 11 located opposite the mandrel is hollowed to form a chip chute. A moveable tailstock 25 comprising a retractable center 26 is supported by the table 12, utilizing grooves in the latter for its attachment; the tailstock can be displaced along the table while remaining aligned on the axis C of the mandrel 22.

The slideways 14 serve as guide in translation for a first carriage 31 in the form of a vertical column provided with a saddle 32 with plane elongated in the direction of the slideways. The first carriage 31 can move along its slideways 14 in a direction X parallel to the axis C of the mandrel; the movement of the carriage 31 is induced by the rotation of a screw 33 borne by the saddle 32 and cooperating with a nut 34 (FIG. 3) which is firmly attached to the frame.

The column 31, due to slideways 28, serves as translation guide for a second carriage 35 which can be displaced along the direction Z perpendicular to the direction X and perpendicular to the plane of the table 12; the column bears a motor for the driving of a screw 37 for the displacement of the second carriage.

The second carriage 35 itself serves, due to slideways 29, as translation guide for a third carriage 36 along an axis Y perpendicular both to the axis X and to the axis Z. The third carriage 36 bears a rotary turret 38 the axis of rotation or indexing of which is parallel to the axis Y of translation of the third carriage. It furthermore supports means 39 for controlling the different maneuvers of the turret, means 41 for the displacement of the carriage along the axis Y, and means 42 for driving the rotary tools in rotation; the means 41 are essentially formed of a motor driving a screw which is borne by the third carriage and engages in a nut integral with the second carriage, and the means 42 are essentially formed of a motor which, by means of belt, shaft and bevel-gear within the turret, drives the toolholder mandrel of the latter. The means 41 and 42, which are known from the prior art of modern machine tools, will not be more explicitly described.

FIGS. 3 to 5, in which there are entered a number of reference numbers of the preceding figures, make it possible better to locate different component elements of the machine tool; there will furthermore be noted in these figures the position of the drive means 43 of the screw 33 which are supported by the saddle 32. There will also be noted a tool changer 45 which is arranged substantially above the end of the bench 11 near a tool magazine 46 located along the extension of the bench 11; in the example shown in the figure, the magazine is of the carousel type, turning around a vertical shaft 47, but it could also be of the chain type. The changer, in one embodiment, grasps the tools positioned vertically in the magazine and, after having pivoted them by 90°, introduces them horizontally into one of the mandrels of the turret. A chip conveyor 48 is arranged in the extension of the benches 11 and 13.

In FIG. 6, it appears that the table 11 can also receive, in addition to the moveable tailstock, a roller support 15 intended to support the end of the machined workpiece in the event that machinings such as the holes 8 (FIG. 1) are to be made on the end face of the workpiece. Therefore the center 25 can be used for the adjustment of the rollers and then be retracted in order to permit the passage of the tool and of the toolholder turret; this figure clearly illustrates the cooperation of the different means and arrangements entering into the general characteristic defined above.

In FIG. 7 there will be noted, more particularly, a control board 50 having keys such as 51 and a cathode screen such as 52, this board being arranged against the front face of the machine tool substantially facing the moveable tailstock. The board 53 is supported by an articulated arm mechanism 55 permitting them to be placed (arrow 56) in any practical position in front of the machining compartment.

In FIG. 8, but also in FIGS. 3, 4, 5 and 7, a dashed line 49 indicates a partition which separates a first machining compartment, located roughly above the first bench 11, from a second compartment in which the motors and their control (vernier rule) drive and lubricating accessories, etc. are located. This partition comprises, in its longitudinal part substantially in the resting plane of the first bench against the second, a curtain with vertical slats 53 and horizontal slats 54 surrounding the third carriage or ram 36; the slats, which are mounted for sliding on each other, permit the triaxial displacement of the ram while assuring the separation of the two compartments. This partition arrangement prevents chips or other particles from entering into the first compartment and impeding there the operation of the sensitive parts which it contains.

Although the control of the machine tool does not fall within the scope of the present invention, it will be noted, however, that this control is advantageously of numerical type and that it can proceed from the carrying out of a series of elementary programs comprising undefined parameters representing the dimensions and conditions of machining (speeds of displacement, speeds of rotation, type of tools, etc.); the machine tool therefore comprises means for the introducing of these parameters; it also comprises means for the control of the linear displacement of the tool and/or of the rotation of the workpiece holder, as desired by the user; it finally comprises means for memorizing voluntary or programmed operations carried out during the memorization period.

Although an optimal combination of different characteristics of the machine tool of the invention has been described and explained and a particular embodiment has been shown and described, it is to be understood that these characteristics could be combined differently and that other embodiments of machine tools combining these characteristics in a different manner are to be understood to fall within the scope of the present invention.

We claim:

1. A machine tool intended for the machining of parts by the removal of chips, of the machine-tool type comprising:
    a rotary workpiece holder and a toolholder being supported by a common frame;
    said workpiece holder being rotatable around a turning axis, the said turning axis overlying a table having a flat upper face which is parallel to said turning axis and includes means for fastening at least one support means;
    said toolholder being moveable with respect to the workpiece along three orthogonal axes and including two clamping mandrels, one for a stationary tool and the other for a rotary tool; and
    said workpiece holder is operatively connected to drive means such that said workpiece holder is capable of attaining the following group of kinematic motions: immobilization in a given angular position, a slow rotational speed for milling operations not parallel to the turning axis, and a high rotational speed for turning operations, wherein said toolholder is capable of moving in each of said three orthogonal axes during operation of said workpiece holder during said group of kinematic motions.

2. The machine tool of claim 1, wherein the toolholder is a rotary turret which is indexable in at least four positions.

3. The machine tool of claim 1, wherein the said speed of slow rotation is between $10^{-2}$ and 10 rpm, and the said fast speed is about $10^3$ times the slow speed of rotation.

4. The machine tool of claim 1, wherein said centering means is formed by the center of a moveable tailstock which is fastenable on said table.

5. The machine tool of claim 1, wherein said support means is formed by a roller support which can be fastened on the table.

6. The machine tool of claim 2, wherein the mandrels of the toolholder can be driven for clamping and unclamping by means contained within the turret; and wherein each of the two mandrels can assume either horizontal or vertical operating positions, a retracted position, and a loading-unloading position, the latter position being common to the two mandrels; and wherein a loader is associated with the machine tool such that multiple stationary or rotary tools can be utilized for the production of a single said workpiece.

7. The machine tool of claim 1, wherein the frame includes a first workpiece-holder bench and a second toolholder bench, both formed of a material from the group consisting of granite and reconstituted granite.

8. The machine tool of claim 7, wherein the toolholder bench includes a pair of first slideways parallel to said turning axis and arranged in a substantially horizontal plane, the said first slideways serving as a first guide for a first carriage which is moveable horizontally along said first slideways and includes an elongated saddle and a column; said column including a pair of second slideways arranged in a plane perpendicular to the plane of said first slideways and perpendicular to the turning axis of said workpiece holder, the said second slideways serving as a second guide for a second vertically moveable carriage; and said second carriage including a pair of third slideways which are arranged in a plane perpendicular to the planes of said first and second slideways and perpendicular to the turning axis of said workpiece holder, the third slideways serving as a third guide for a horizontally-moveable third carriage which supports the toolholder at an end thereof.

9. The machine tool of claim 2, wherein the axis of rotation or of indexing of the toolholder turret is an axis parallel to the axis of movement of said third carriage.

10. The machine tool of claim 8, wherein
    the first carriage is moved by a first screw engaging a first nut, the first screw being supported by the first carriage and the first nut being integrally formed with the frame, and
    the second carriage is moved by a second screw supported by the column, the second screw engaging a second nut which is integrally formed with the second carriage, and
    the third carriage is moved by a third screw supported by the carriage itself, said third screw engaging a third nut which is integrally formed with the second carriage, and wherein each of said screws is driven in rotation, each by an asynchronous motor controlled by frequency variators.

11. The machine tool of claim 10, wherein the position of each carriage is indicated by a vernier rule device.

12. The machine tool of claim 8, and further including a partition separating a first machining compartment located above the first bench from a second compartment in which centering members are arranged, and said partition including in a longitudinal portion thereof a curtain with vertical and horizontal slats surrounding said third carriage, the said slats being mounted for sliding on each other in order to permit triaxial movement of said third carriage.

13. A machine tool intended for the machining of parts by the removal of chips, of the machine-tool type comprising:
    a rotary workpiece holder and a toolholder being supported by a common frame;
    said workpiece holder being rotatable around a turning axis, the said turning axis overlying a table having a flat upper face which is parallel to said turning axis and includes means for fastening at least one support means;

said toolholder being moveable with respect to the workpiece along three orthogonal axes and including two clamping mandrels, one for a stationary tool and the other for a rotary tool;

said frame including a first workpiece-holder bench and a second toolholder bench, both formed of a material from the group consisting of granite and reconstituted granite, said toolholder bench including a pair of first slideways parallel to said turning axis and arranged in a substantially horizontal plane, the said first slideways serving as a first guide for a first carriage which is moveable horizontally along said first slideways and includes an elongated saddle with a column wherein said column includes a pair of second slideways arranged in a plane perpendicular to the plane of said first slideways and perpendicular to the turning axis, the said second slideways serving as a second guide for a second vertically moveable carriage said second carriage including a pair of third slideways which are arranged in a plane perpendicular to the planes of said first and second slideways and perpendicular to the turning axis, the third slideways serving as a third guide for a horizontally moveable third carriage which supports the toolholder at an end thereof;

a partition separating a first machining compartment located above the first bench from a second compartment in which centering members are arranged, said partition including in a longitudinal portion thereof a curtain with vertical and horizontal slats surrounding said third carriage, the said slats being mounted for slidable movement relative to each other in order to permit the triaxial movement of said third carriage; and said workpiece holder being operatively connected to drive means allowing said workpiece holder to perform one of the three kinematics of the following group of kinematics: the immobilizing in a given angular position, a slow speed of rotation for milling operations not parallel to the turning axis, and a high speed of rotation for turning operations.

* * * * *